(12) United States Patent
Syrovátka et al.

(10) Patent No.: US 12,453,300 B2
(45) Date of Patent: Oct. 28, 2025

(54) AGRICULTURAL TILLAGE DEVICE

(71) Applicant: BEDNAR FMT, Prague (CZ)

(72) Inventors: Pavel Syrovátka, Kleneč (CZ); Vojtěch Bednář, Prague (CZ); Jakub Zígler, Brandýs nad Labem-Stará Boleslav (CZ); Vojtěch Wehrsinger, Zlonice (CZ)

(73) Assignee: BEDNAR FMT (CZ)

( * ) Notice: Subject to any disclaimer, the term of this patent is extended or adjusted under 35 U.S.C. 154(b) by 574 days.

(21) Appl. No.: 17/916,336

(22) PCT Filed: Apr. 1, 2021

(86) PCT No.: PCT/CZ2021/050041
§ 371 (c)(1),
(2) Date: Sep. 30, 2022

(87) PCT Pub. No.: WO2021/197520
PCT Pub. Date: Oct. 7, 2021

(65) Prior Publication Data
US 2023/0172089 A1    Jun. 8, 2023

(30) Foreign Application Priority Data

Apr. 1, 2020 (CZ) ............................... CZ2020-183

(51) Int. Cl.
*A01B 49/02* (2006.01)
*A01B 49/06* (2006.01)

(52) U.S. Cl.
CPC ............ *A01B 49/027* (2013.01); *A01B 49/06* (2013.01)

(58) Field of Classification Search
CPC ....... A01B 49/027; A01B 49/02; A01B 49/00; A01B 49/06; A01B 49/04
See application file for complete search history.

(56) References Cited

U.S. PATENT DOCUMENTS

| | | | |
|---|---|---|---|
| 6,276,462 B1 * | 8/2001 | Dietrich, Sr. .......... | A01B 49/02 172/138 |
| 8,657,023 B2 * | 2/2014 | Casper .................. | A01B 63/111 172/4 |

* cited by examiner

*Primary Examiner* — Christopher J. Novosad
(74) *Attorney, Agent, or Firm* — Bochner PLLC; Andrew D. Bochner

(57) ABSTRACT

An agricultural tillage device (1) comprising a support frame (2), a roller frame (3) attached to the support frame (2) by a hydraulic puller (31) and located behind the support frame (2) with respect to the direction (100) of travel. Cutting rotary discs (4) provided with cutting projections (41) are attached to the support frame (2) of the agricultural device (1) by disc attachments (42), behind the cutting rotary discs (4) with respect to the direction (100) of travel, tines (5) are attached to the support frame (2), wherein each tine (5) is provided with two protective discs (6), wherein one protective disc (6) is located on the left side of the tine (5) and one protective disc (6) is located on the right side of the tine (5), behind the tines (5) with respect to the direction (100) of travel, at least one rotary hardening roller (7) is attached to the roller frame (3), and behind the rotary hardening roller (7) with respect to the direction (100) of travel, ridgers (8) are attached to the roller frame (3).

12 Claims, 7 Drawing Sheets

AGRICULTURAL TILLAGE DEVICE

TECHNICAL FIELD

The invention relates to an agricultural tillage device.

BACKGROUND OF THE INVENTION

The current state of the art provides a considerable number of agricultural tillage devices with different uses. These agricultural devices then comprise working units positioned in rows, where each working unit serves a given purpose, wherein it is convenient for the working units to complement each other efficiently. Often, some working units are attached separately outside the support frame of the entire agricultural device. However, the problem with these devices is the insufficient pressure of the working units, which are thus unable to penetrate the soil to great depths.

An agricultural device with tillage working units is described e.g., in the document EP 2 661 168 B1 called *Agricultural machine*. On the support frame, this device has cutting rollers, then disc cultivators, and finally a set of rollers for hardening the tilled soil. Another device representing the state of the art is described e.g., in the document US 2019/0183029 called *Agricultural field preparation device*, which is provided with a row of disc cultivators, reservoirs containing fertilizer or seed, ducts distributed over the entire width of the working width of the agricultural device, and then smoothing tapes. Another such device is chisel ploughs, which may also be equipped with other tools that improve the result of the tillage, such as the device described in the document GB2146511A called *Ploughs*.

SUMMARY OF THE INVENTION

The above shortcomings are eliminated to a certain extent by an agricultural tillage device comprising a support frame, a roller frame attached to the support frame by means of a hydraulic puller and located behind the support frame with respect to the direction of travel. Cutting rotary discs with cutting projections are attached to the support frame of the agricultural device using disc attachments, behind the cutting rotary discs with respect to the direction of travel, tines are attached to the support frame, wherein each tine is provided with two protective discs, one protective disc is located on the left side of the tine and one protective disc is located on the right side of the tine. Behind the tines with respect to the direction of travel, at least one rotary hardening roller is attached to the roller frame provided with pressure surfaces on the peripheral side, and behind the rotary hardening roller with respect to the direction of travel, ridgers are attached to the roller frame. An advantage of this solution consists in the attachment of the roller frame to the support frame by means of the hydraulic puller. Therefore, the roller frame is height-adjustable with respect to the support frame, and it is therefore possible to regulate the travel height of the rotary hardening rollers and ridgers.

The tines are preferably positioned in two rows and no other working units are positioned between them. The protective discs of the tines are distributed on the agricultural device such that exactly two protective discs belong to each tine, wherein each disc belongs to exactly one tine, in other words, the tines do not share the protective discs.

Other preferred embodiments of the present invention include attaching a harrow to the support frame, the harrow is located in front of the cutting rotary discs with respect to the direction of travel of the agricultural device. Furthermore, cutting rollers may be attached to the support frame of the agricultural device, in front of the cutting rotary discs with respect to the direction of travel of the agricultural device. Optionally, cleaning discs may be attached to the support frame in front of the cutting rotary discs with respect to the direction of travel, alternatively, the cleaning discs may be attached to the agricultural device such that they are located between the cutting rotary discs and the tines. Furthermore, cleaning discs may be attached to the support frame of the agricultural device. These are then located between the cutting rotary discs and the tines. Furthermore, a leveler may be attached to the roller frame of the agricultural device, wherein it is located in front of the hardening roller with respect to the direction of travel. Said embodiments of the invention may be combined to achieve an optimal tillage depending on the properties of the soil in terms of its moisture, hardness, etc.

Preferably, the agricultural device may further comprise a distribution head attached to the support frame and provided with seed or fertilizer ducts, these ducts are attached to the tines through their end. As a result of this, it is also possible to apply fertilizer or seed to the soil during tilling and eliminate the need for additional tillage using e.g., a sower. In this embodiment, the agricultural device further comprises a reservoir in which the seed or fertilizer is stored. The reservoir is connected to the distribution head, wherein transport of the seed or fertilizer is possible within the connection. This is usually provided by a strong air flow, which carries the seed or fertilizer in granular form and distributes it in the distribution head to the individual ducts.

Preferably, the agricultural device then may be provided with at least one transport wheel, which facilitates transport of the agricultural tillage device by road.

DESCRIPTION OF DRAWINGS

A summary of the invention is further clarified using exemplary embodiments thereof, which are described with reference to the accompanying drawings, in which.

EXEMPLARY EMBODIMENTS OF THE INVENTION

Figure 1:
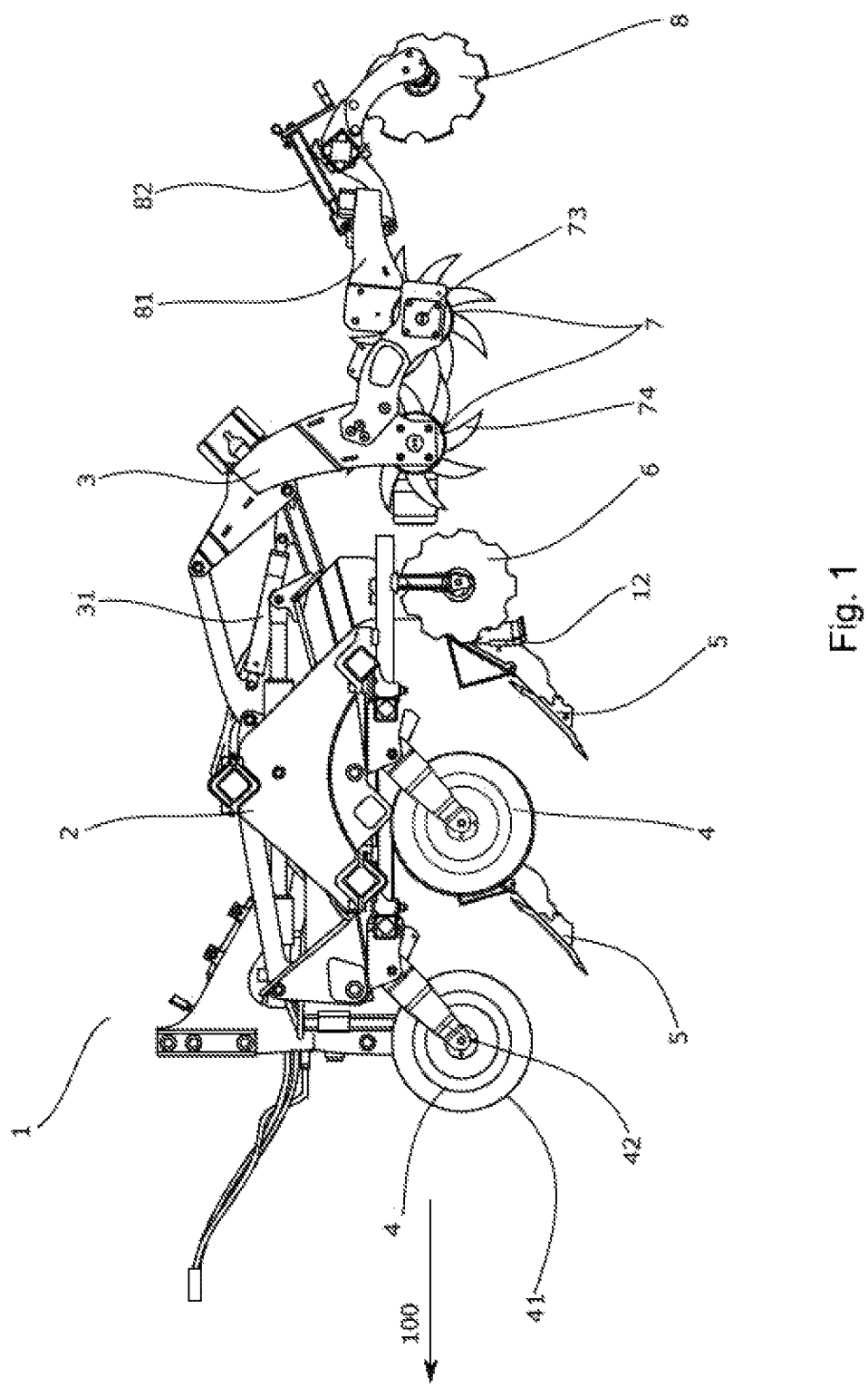
FIG. 1 shows a side view of the agricultural tillage device, in which consecutively the cutting rotary discs, tines covered by the protective discs, rotary hardening rollers made as tandem tip sections attached to the roller frame, and ridgers are provided as working units.
Figure 2:
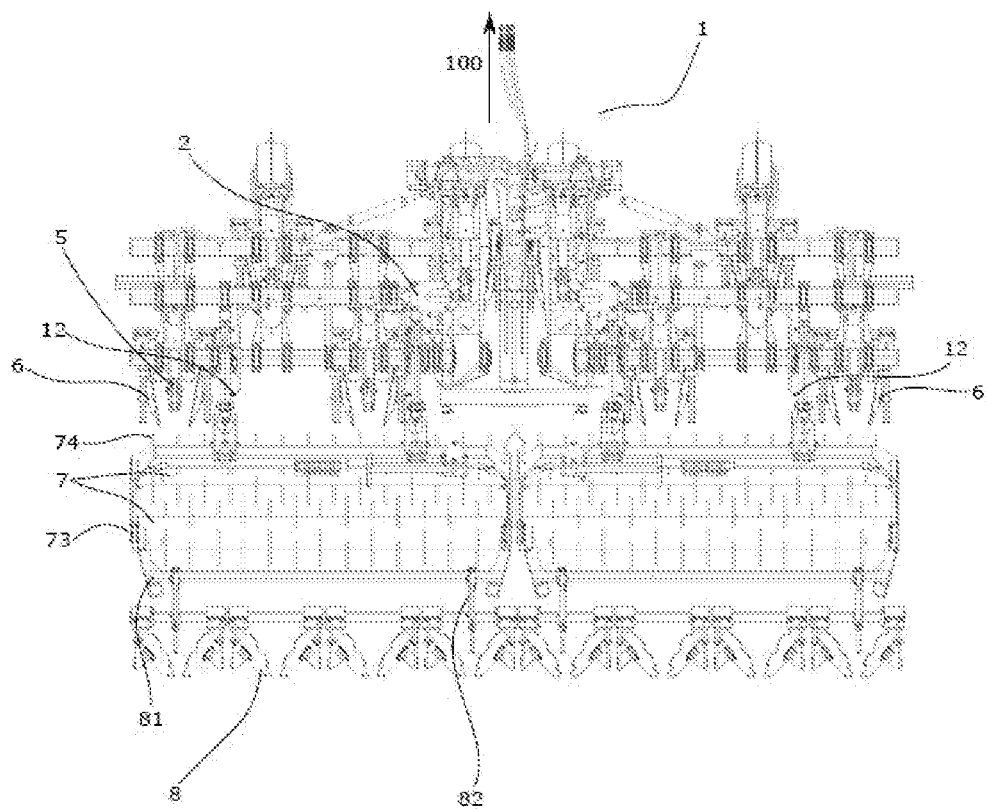
FIG. 2 shows a top view of the agricultural tillage device.
Figure 3:
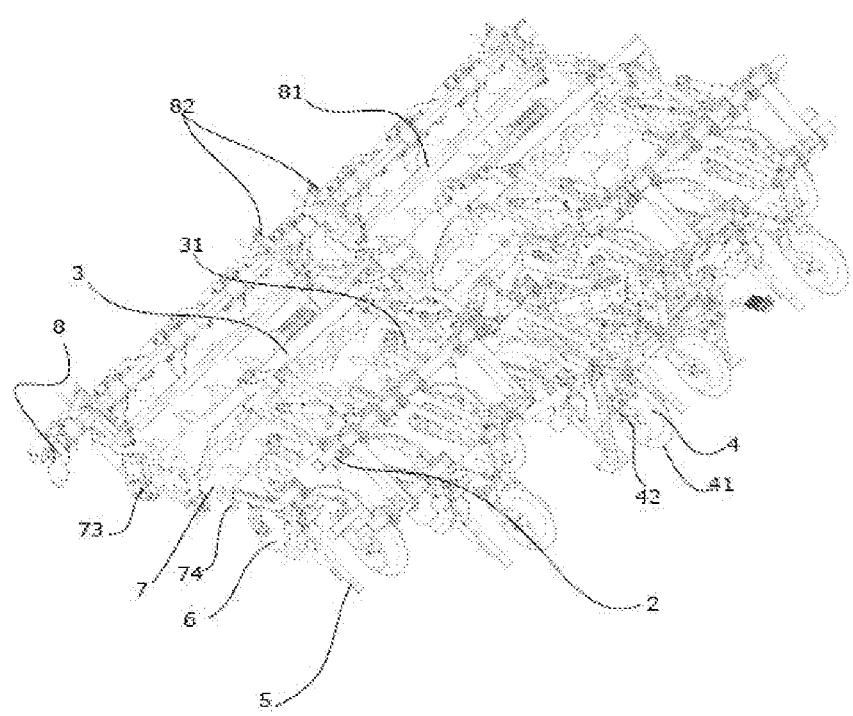
FIG. 3 shows an ISO view of the agricultural tillage device.

The invention will be further clarified using exemplary embodiments with reference to the respective drawings, which, however, have no limiting effect from the point of view of the scope of protection. An agricultural tillage device 1 is shown in FIGS. 1-3. The device 1 comprises a support frame 2 and a roller frame 3 attached to the support frame 2 by means of a hydraulic puller 31. The roller frame 3 is attached behind the support frame 2 with respect to the direction 100 of travel. The agricultural device 1 comprises several working units intended for various tillage methods. The working units are usually arranged in individual rows, each row contains a specified type of working units. In a preferred embodiment, some types of working units, e.g., tines 5 or discs 4, are distributed on the agricultural device 1 such that the distance between the individual working units between all working units of the given row is the same. In the context of the application, a working unit is intended to mean any device actively working the processed soil, or coming into contact with it, grinding it, moistening it, digging it, digging it over, etc.

At least one cutting rotary disc 4, or alternatively called slicing disc, is attached to the support frame 2 of the agricultural device 1 by means of a disc attachment 42. The cutting rotary disc 4 is, on its peripheral side, provided with projections 41 with sharpened edge. The cutting rotary discs 4 are positioned at even distances over the entire working width of the agricultural device 1. The cutting rotary discs 4 are attached to the attachments 42 in a rotary fashion, and during the passage of the agricultural device 1, they are in contact with the soil and rotate. During this rotary movement, the cutting projections 41 then cut the soil and the soil is thus partially tilled.

Behind the cutting rotary discs 4 with respect to the direction 100 of travel, tines 5 are located. The tines 5 are attached to the support frame 1. In an exemplary embodiment, both active tines 5 and passive tines 5 are used. The active tines 5 mix the tilled soil, whereas the passive tines 5 merely cut the tilled soil. On both sides of each tine 5, protective discs 6 are located, therefore, each tine 5 has exactly two protective discs 6. The protective discs 6 are attached to the support frame 2 by means of attachments 61 of the protective discs. The attachments 61 of the protective discs are fastened to the support frame 2 such that it is possible to regulate the height of the protective discs 6 with respect to the tilled soil. The protective discs 6 then serve on the agricultural device 1 to prevent the tilled soil from flying off. For example, the tines 5 may be then positioned in two rows. This embodiment is preferable particularly in the case of agricultural devices 1 where, due to the structural arrangement and width of the device 1, it is necessary to choose a higher number of tines 5. Simultaneously, the cutting rotary discs 4 may be positioned in two rows. In this embodiment, it is then preferable for the first row of tines 5 with respect to the direction 100 to be at the same level as the second row of cutting rotary discs 4 with respect to the direction 100 of travel. In other words, an axis passing through the centers 43 of the cutting rotary discs 4 intersects the tines 5 of the first row.

Figure 6:
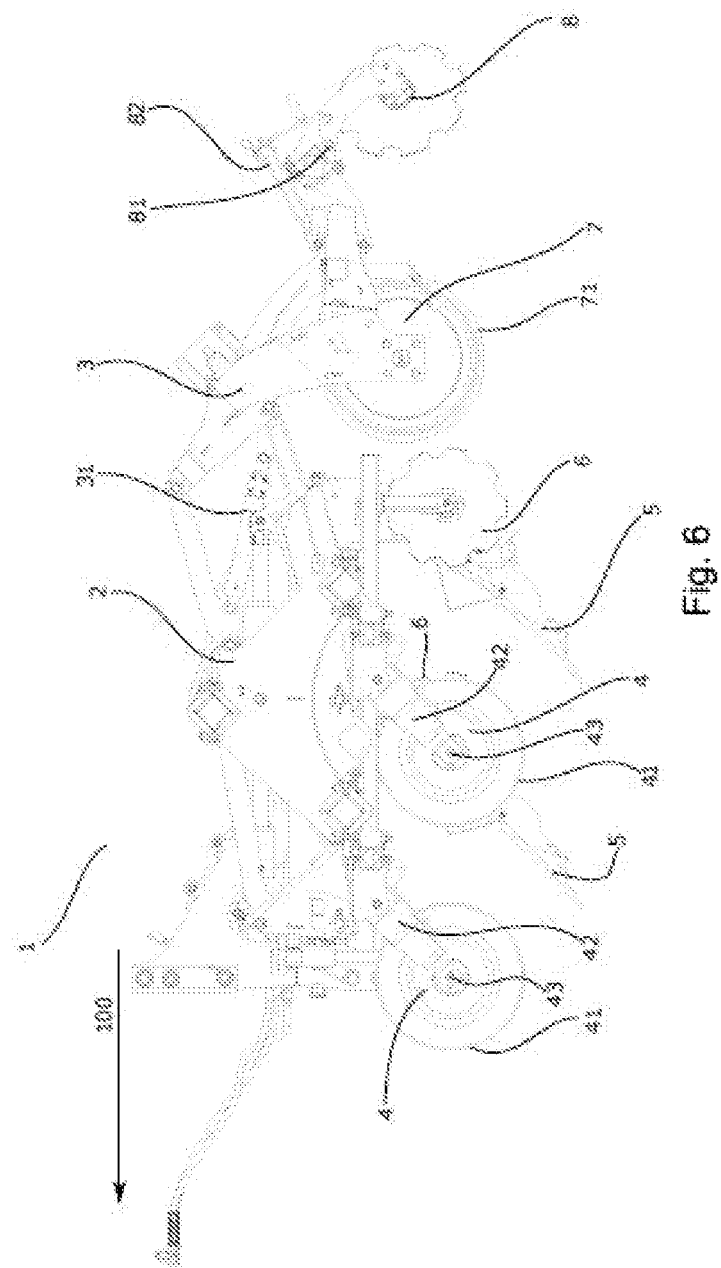
FIG. 6 shows a side view of the agricultural tillage device, where the hardening rollers are provided with hardening rings.
Figure 7:
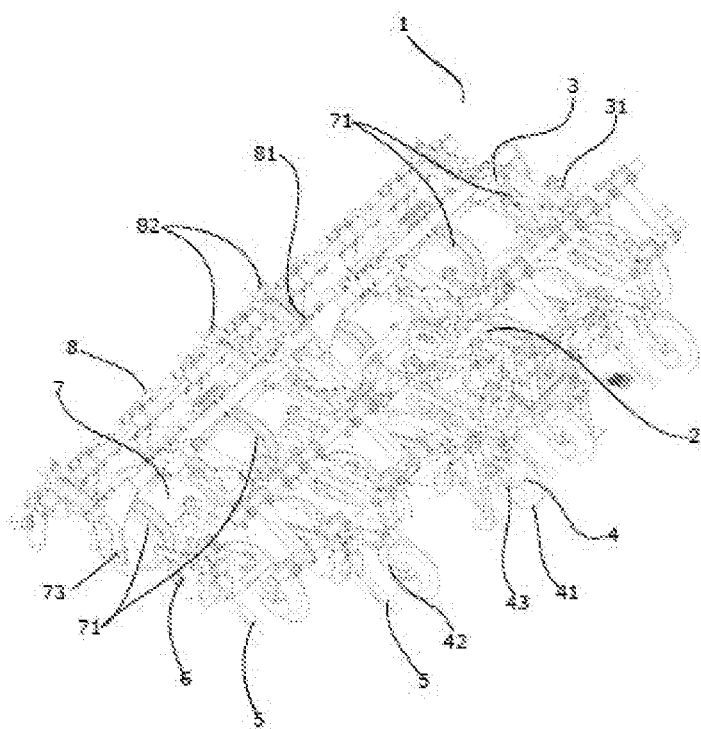
FIG. 7 shows an ISO view of the agricultural tillage device, where the hardening rollers are provided with hardening rings.

Behind the tines 5 with respect to the direction 100 of travel, hardening rollers 7 are located. Exemplary embodiments of the invention provide two functional variants of the hardening rollers 7. In the first embodiment of FIGS. 6 and 7, the hardening rollers 7 are, on their peripheral portion along the central axis, or the axis passing through the center of the hardening rollers 7, provided with individual hardening rings 71. These are positioned at regular intervals and are used to harden the tilled soil for further tillage, especially sowing. In a second embodiment, the hardening roller 7 is composed of two discs connected, on the one hand, in the area of the central axis 72 and, on the other hand, by tubes or rods. The tubes or rods are then attached to the hardening roller 7 such that they form an angle other than 90° with the direction 100 of travel of the agricultural device. According to the first exemplary embodiment of the invention, the hardening rollers 7 are attached to the support frame 2 of the agricultural device 1 by means of attachments 73 of the hardening rollers. Another exemplary embodiment of the invention comprises the attachment of the hardening rollers 7 to the roller frame 3. Since the roller frame 3 is attached to the hydraulic puller 31, it is possible to regulate the pressure of the hardening rollers 7 pushing on the tilled soil, or their depth in the tilled soil. Alternatively, as shown in FIGS. 1-5, the hardening rollers 7 may be made as tandem tip sections. In this embodiment, the hardening rollers 7 are composed of a pair of rollers located behind each other with respect to the direction of travel 100. These rollers are then provided with a number of curved tines 74 regularly distributed both around the circumference of the hardening roller 7 and over the entire length of the hardening roller. Another option is then to use a continuous hardening roller 7 in the shape of a conventional roller exerting a continuous pressure over its entire width.

Behind the hardening rollers with respect to the direction 100 of travel, ridgers 8 are located which are used to create ridges. A ridge is intended to mean a protective layer of soil in the furrow. The first exemplary embodiment then uses ridging discs as the ridgers 8, another exemplary embodiment of the invention then uses ploughing tapes. The ridgers 8 are then attached to the roller frame 3 using ridger attachments 81. This connection may then for example be made movable by means of a length-adjustable ridger arm 82. The adjusted length is then intended to mean the distance from the nearest working unit. In an exemplary embodiment, the nearest working unit is a set of hardening rollers 7. The adjustment of the distance of the length-adjustable ridger arm 82 may be performed manually, e.g., by means of a crank with a cotter pin, as can be seen in the figures of the exemplary embodiments. The adjustment of the length of the ridger arm 82 is performed by turning the crank, which, when a suitable position is reached, is secured by the cotter pin or other securing mechanism. Another option to regulate the length of the ridger arm 82 is to use a hydraulic or pneumatic mechanism or an electric motor. It is then suitable to control these mechanisms by either an interface available directly on the agricultural device 1 or from the cabin of the towing device behind which the agricultural tillage device 1 is connected. For example, such a device may be a tractor. However, it is also possible to use other devices fulfilling this function, since, in terms of the scope of protection, they achieve the same tillage effect.

Other exemplary embodiments of the invention act as an extension of the agricultural device 1 described above and thus include all components in a given arrangement, as described above. The below described embodiments of the invention may be combined.

In another exemplary embodiment of the invention, a harrow is attached to the support frame 2 of the agricultural device 1, made as evenly distributed tips or rods that are used for primary tillage, especially when entering unharvested or untilled soil. The tips or rods may then have different angles of inclination relative to the ground to achieve optimal tillage of the unharvested soil. Another exemplary embodiment of the invention of FIGS. 4 and 5 uses cutting rollers 10 to achieve the same purpose. These are made as thin rollers, or axes, provided with discs at their ends. The individual discs are then connected by elongated sharpened tapes. Using the cutting rollers 10, the soil is prepared in advance for further tillage by the agricultural device 1 according to the exemplary embodiments described above. The harrow or cutting rollers 10 are attached to the support frame 2 of the agricultural device 1. In the exemplary embodiment of FIGS. 4 and 5, the cutting rollers 10 are attached to the support frame 2 as the very first working units with respect to the direction 100 of travel of the agricultural device 1. Alternatively, or in addition, the cutting rollers 10 may be attached between the first and second row of the cutting rotary discs 4.

Figure 4:
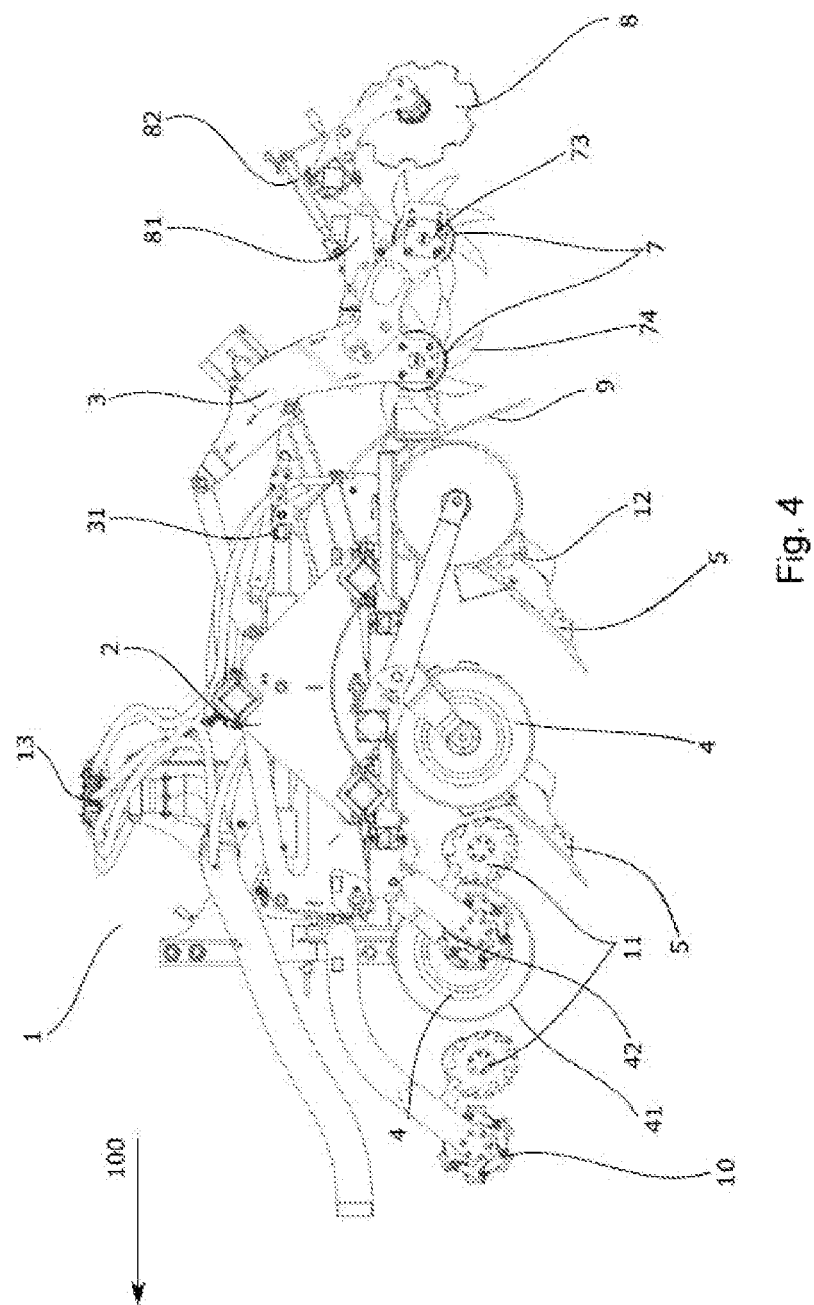
FIG. 4 shows a side view of the agricultural tillage device further comprising a leveler, cleaning discs, and cutting rollers.
Figure 5:
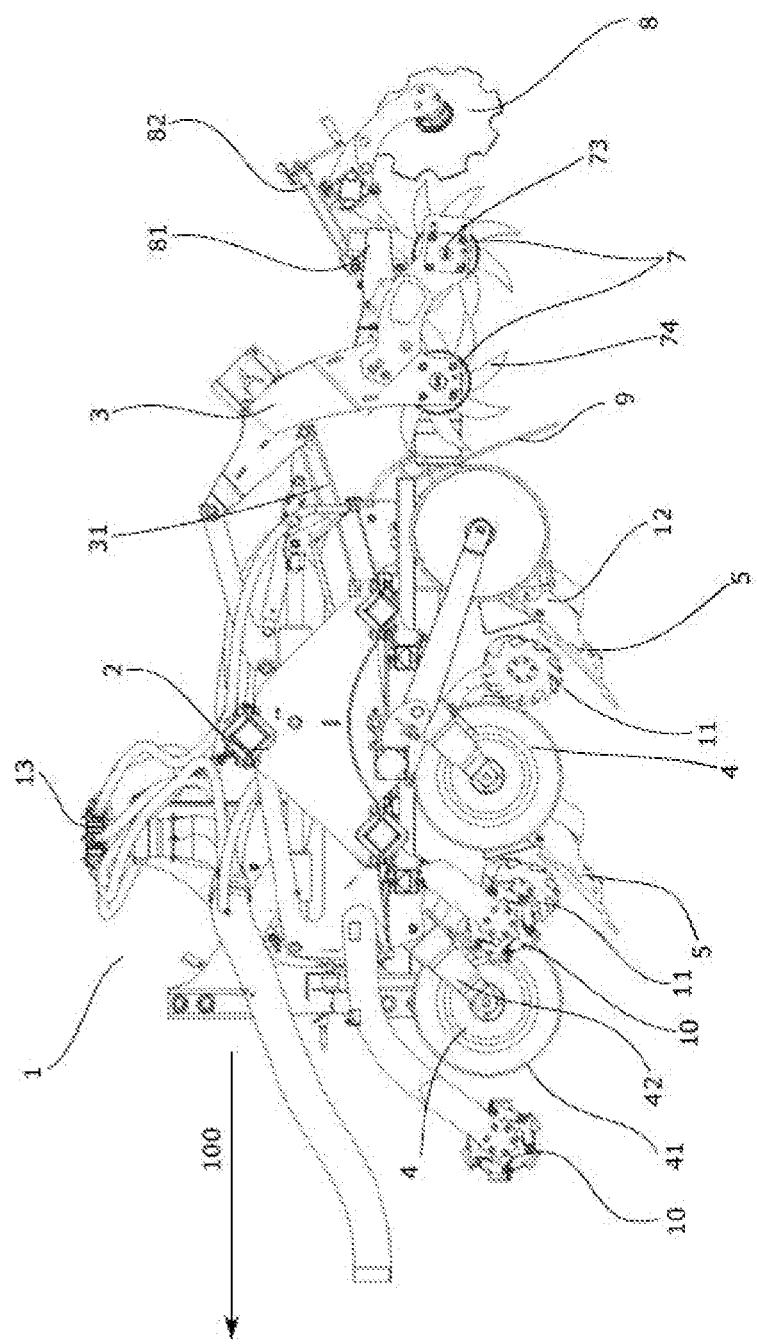
FIG. 5 shows a side view of the agricultural tillage device further comprising a leveler, cleaning discs, and cutting rollers in an alternative embodiment.

In another exemplary embodiment of the invention of FIGS. 4 and 5, between the cutting rotary discs 4 and tines 5, cleaning discs 11 are located. The cleaning discs 11 are attached to the support frame 2 of the agricultural device 1 and, through their rotary movement, they provide the cleaning of the cutting rotary discs 4 or the cutting rollers 10. Therefore, in the first embodiment, they may be attached as the second working unit immediately behind the cutting rollers 10; alternatively, or in addition, they may be located between the first and the second row of the cutting rotary discs 4. Another option is then to position them between the first and the second row of tines 4, as in FIG. 5.

In another exemplary embodiment of the invention of FIGS. 4 and 5, the agricultural device 1 comprises fertilizer or seed ducts 12 positioned at regular intervals. The fertilizer or seed ducts 12 are used to distribute the fertilizer into the tilled soil. The fertilizer or seed ducts 12 are positioned between a row of tines 5 and hardening rollers 7. On the support frame 2, a distribution head 13 is then located that is used to distribute the seed or fertilizer into the individual ducts 12, to which it is connected using hoses or tubes. In an exemplary embodiment of the invention, the fertilizer or seed ducts 12 may then be located on the back of the tines 5.

In another exemplary embodiment of the invention, the agricultural device 1 comprises a leveler 9, which is attached to the roller frame 3 and is located in front of the hardening roller 7 with respect to the direction 100 of travel of the agricultural device. It fulfills a similar function as the hardening rollers 7, i.e., it is used to harden the furrow in the tilled soil.

The hydraulic puller 31 is then used to regulate the travel height of the roller frame 3 with respect to the tilled soil. It is controlled by a hydraulic unit that is usually controlled from the cabin of an agricultural vehicle behind which the agricultural device 1 is connected.

INDUSTRIAL APPLICABILITY

The invention may be used to till soil for agricultural purposes, particularly in areas where it is necessary to regulate the travel depth of the individual working units that are not attached to the main support frame.

The invention claimed is:

1. An agricultural tillage device (1) comprising a support frame (2), a roller frame (3) attached to the support frame (2) by means of a hydraulic puller (31) and located behind the support frame (2) with respect to a direction (100) of travel, characterized in that cutting rotary discs (4) provided with cutting projections (41) are attached to the support frame (2) of the agricultural tillage device (1) using disc attachments (42), behind the cutting rotary discs (4) with respect to the direction (100) of travel, tines (5) are attached to the support frame (2), wherein each tine (5) is provided with two protective discs (6), wherein one protective disc (6) is located on a left side of the tine (5) and one protective disc (6) is located on a right side of the tine (5), behind the tines (5) with respect to the direction (100) of travel, at least one rotary hardening roller (7) is attached to the roller frame (3), and behind the at least one rotary hardening roller (7) with respect to the direction (100) of travel, ridgers (8) are attached to the roller frame (3).

2. The agricultural tillage device (1) of claim 1, characterized in that the roller frame (3) is height-adjustable with respect to the support frame (2).

3. The agricultural tillage device (1) of claim 1, characterized in that the tines (5) are located in two rows, wherein between a first row of the tines (5) and a second row of the tines (5), no other working units are located.

4. The agricultural tillage device (1) of claim 1, characterized in that each protective disc (6) belongs to exactly one tine (5).

5. The agricultural tillage device (1) of claim 1, characterized in that in front of the cutting rotary discs (4) with respect to the direction (100) of travel, a harrow is attached to the support frame (2).

6. The agricultural tillage device (1) of claim 1, characterized in that in front of the cutting rotary discs (4) with respect to the direction (100) of travel, cutting rollers (10) are attached to the support frame (2).

7. The agricultural tillage device (1) of claim 1, characterized in that in front of the cutting rotary discs (4) with respect to the direction (100) of travel, cleaning discs (11) are attached to the support frame (2).

8. The agricultural tillage device (1) of claim 1, characterized in that between the cutting rotary discs (4) and the tines (5), cleaning discs (11) are attached to the support frame (2).

9. The agricultural tillage device (1) of claim 1, characterized in that the agricultural tillage device further comprises a distribution head (13) attached to the support frame (2), provided with individual ducts (12) distributed on the tines (5).

10. The agricultural tillage device (1) of claim 1, characterized in that the agricultural tillage device further comprises a leveler (9) attached to the roller frame (3) and located in front of the at least one rotary hardening roller (7) with respect to the direction (100) of travel.

11. The agricultural tillage device (1) of claim 1, characterized in that the ridgers (8) are attached to the roller frame (3) using a length-adjustable ridger arm (82).

12. The agricultural tillage device (1) of claim 1, characterized in that the agricultural tillage device further comprises at least one transport wheel.

* * * * *